United States Patent [19]
Ishiguro

[11] Patent Number: 4,881,097
[45] Date of Patent: Nov. 14, 1989

[54] APPARATUS FOR CONTROLLING AUTOMATIC FOCUSING IN CAMERAS

[75] Inventor: Yasuaki Ishiguro, Fujimi, Japan

[73] Assignee: Nikon Corporation, Tokyo, Japan

[21] Appl. No.: 165,334

[22] Filed: Mar. 8, 1988

[30] Foreign Application Priority Data

Mar. 13, 1987 [JP] Japan .................................. 62-58059

[51] Int. Cl.⁴ .......................... G03B 1/00; G03B 3/10; G03B 19/12
[52] U.S. Cl. .................................... 354/402; 354/152; 354/173.1; 354/412; 354/266
[58] Field of Search ........................ 354/400, 402–408, 354/412, 430, 266, 173.1, 173.11, 152

[56] References Cited

U.S. PATENT DOCUMENTS 4,284,336  8/1981  Iwata et al. ..................... 354/402 X
4,435,058  3/1984  Yoshida et al. ..................... 354/403

Primary Examiner—W. B. Perkey
Attorney, Agent, or Firm—Shapiro and Shapiro

[57] ABSTRACT

In an automatic focusing camera in which a focus detector determines the amount of movement of a phototaking lens on the basis of light from an object via a moving mirror in the phototaking optical path, timing of the start of the actuation of a mirror operating means, which retracts the mirror from the phototaking optical path, is controlled so that retraction of the moving mirror is completed substantially at the same time that focusing movement of the lens is completed. The time from the start of focal point detection to the completion of lens movement and mirror retraction can be made constant, and the shot speed in continuous photography can be selected.

5 Claims, 5 Drawing Sheets

APPARATUS FOR CONTROLLING AUTOMATIC FOCUSING IN CAMERAS

BACKGROUND OF THE INVENTION

1. Field of the Invention

The present invention relates to an apparatus for controlling automatic focusing in continuous photographing cameras.

2. Related Background Art

In general, in automatic focusing cameras wherein a camera lens is shifted by means of a motor to a best focus position in response to an object distance, "out of focus" is prevented by permitting release after the focusing operation has been completed. When the continuous photographing is performed by the use of such automatic focusing camera, a shot speed cannot be maintained constant, since such shot speed varies in dependence upon contrast and/or brightness of an object to be photographed. In this connection, to alleviate the above disadvantage when a constant shot speed is requested, an automatic focusing camera wherein a second shot, a third shot and the like are effected while maintaining the best focus position for a first shot has been proposed.

In this case, although there is no problem when a stationary object is photographed by means of a camera situated in a fixed position, there arises a problem that "out of focus" is generated when the object is continuously moving and/or the camera position is varied.

In order to solve such problem, there has been proposed an automatic focusing camera wherein a predetermined time interval (from when a film has been wound up for the next shot) is pre-set for detecting the best focus position, a focus detecting operation and the shifting of the camera lens to the best focus position are effected within the predetermined time interval, and the release is permitted after the predetermined time interval elapses.

According to such automatic focusing camera, even when the object is moving and/or the camera position is varied, the possibility of "out of focus" is reduced in comparison with the first-mentioned proposed automatic focusing camera. However, in this automatic focusing camera, there arises another problem that the shot speed decreases by an amount corresponding to the above-mentioned predetermined time interval.

SUMMARY OF THE INVENTION

An object of the present invention is to provide an apparatus for controlling the automatic focusing in cameras, capable of preventing the decrease of the shot speed.

The present invention can be applied to a camera comprising focus detecting means for receiving light from an object through a return mirror and for detecting a best focus or in-focus position on the basis of the received light, and electric driving means for shifting a camera lens to obtain the best focus position in response to an output of the focus detecting means, and wherein mirror-up operation, exposing operation and film winding-up operation are repeated in order to permit the continuous photographing. Further, in the present invention, the above problems are solved by providing sequence control means for outputing a signal for initiating the mirror-up operation while the camera lens is being shifted by means of the electric driving means to obtain the best focus position.

According to the present invention, while the continuous photographing operation is performed, when the camera lens is being shifted by means of the electric driving means, the sequence control means outputs the signal for initiating the mirror-up operation, thereby permitting the mirror-up operation during the shifting of the camera lens. Consequently, in the camera wherein the focus detection is effected for each exposing operation to permit the continuous photographing,, the shot speed can be increased in comparison with those in the conventional cameras.

BRIEF DESCRIPTION OF THE DRAWINGS

FIGS. 1 to 5 are views for explaining an embodiment of a controlling apparatus according to the present invention, wherein FIG. 1 is a block diagram showing the whole construction of the apparatus, FIGS. 2, 3 and 4 are flow charts showing processes effected by the apparatus, respectively, and FIG. 5 is a time chart showing the operations of various elements of the apparatus.

DESCRIPTION OF THE PREFERRED EMBODIMENTS

The present invention will now be explained with reference to FIGS. 1 to 3.

Figure 1:
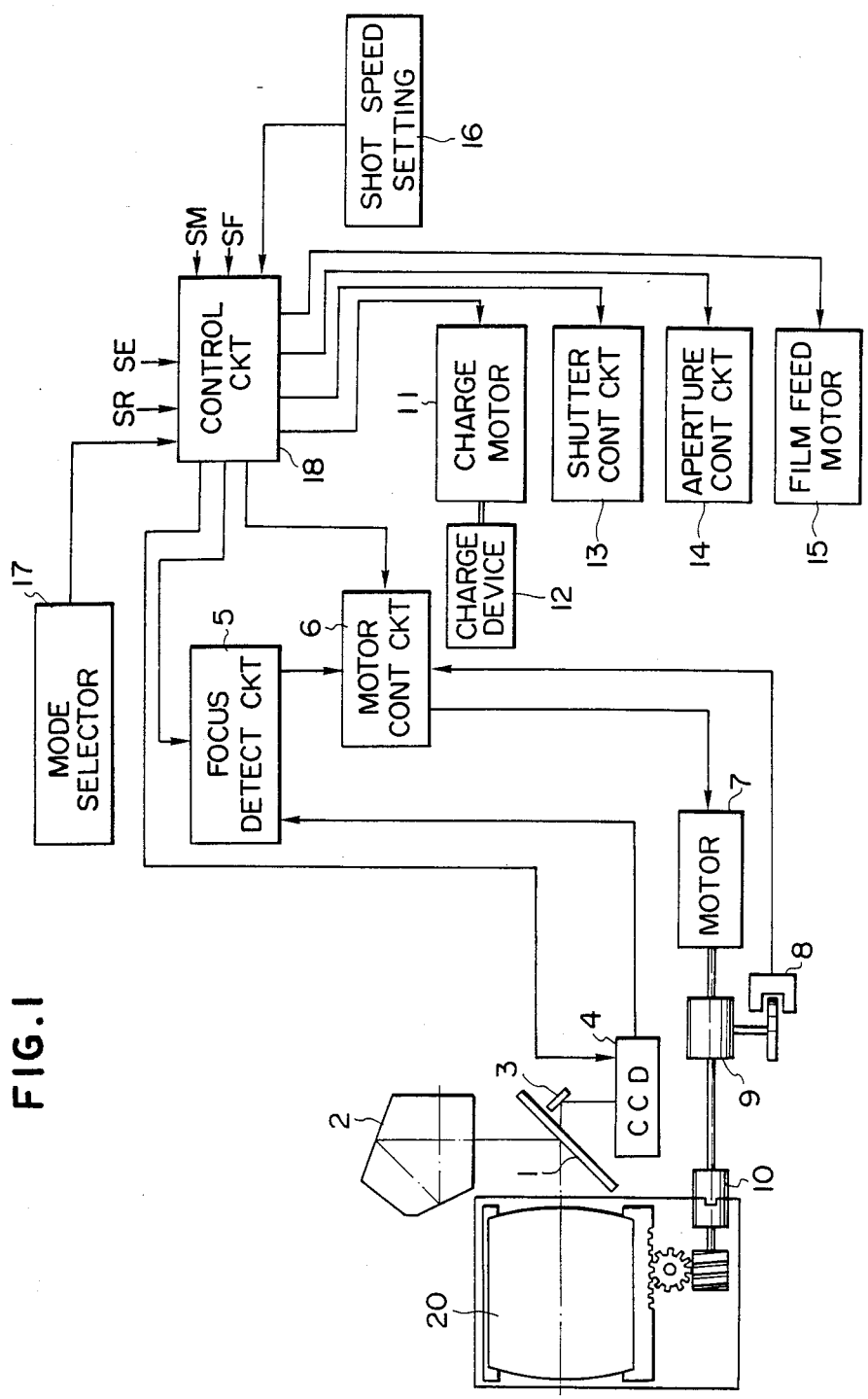

In FIG. 1, as is conventional, a camera includes a camera body within which a main return mirror 1, a pentagonal prism 2, a sub-mirror 3 and a focus detecting photoelectric conversion device 4 having a photoelectric element such as CCD are arranged. Flux of light introduced into the camera body through a camera lens 20 is, on one hand, directed to the pentagonal prism 2 by means of the main return mirror 1. This flux of light is utilized for observing an object to be photographed by means of an eye piece (not shown). On the other hand, flux of light passed through the main return mirror 1 is directed, by means of the sub-mirror 3, to the CCD 4 arranged in a plane equal to a plane of a film (not shown), thereby focusing or forming a light image of the object on a detecting surface of the CCD. This light image is converted into an image signal and then is supplied to a focus detect circuit 5.

The focus detect circuit 5 performs a focus detecting operation as is conventional, on the basis of the image signal of the object, thereby determining a difference between a focusing plane obtained by the camera lens and an expected focusing plane for the film and the like, i.e., determined a defocused amount and a defocused direction, and then supplies a focus detecting signal representing such amount and direction to a motor control circuit 6.

The motor control circuit 6 determines a driving amount of a motor 7 required for shifting the camera lens 20 to the best focus position, on the basis of the supplied or inputted focus detecting signal, and supplies the determined information to the D.C. motor 7 for adjusting the automatic focusing. Further, said determined information (i.e., the determined driving amount of the motor) is converted into the number of pulses in proportion to a amount of the shift of the camera lens, and then is compared with the number of pulses from a photo-interrupter 8; if both of the number of pulses are equal to each other, the D.C. motor 7 is stopped. The photo-interrupter 8 may be a conventional one which can monitor the driving amount (rotational amount) of the motor 7, and accordingly, the amount of the shift of the camera lens. The motor 7 can also be stopped when it receives, from the focus detect circuit 5, a best focus signal (one of the focus detecting signals) representing the fact that the focusing has been completed. The camera lens 20 can be shifted along an optical axis thereof by rotating a coupling 10 projecting from a mount plane by means of the D.C. motor 7 through a reduction gear 9.

A charge motor 11 is provided for actuating a charge device 12 which effects the charging for a shutter (i.e., a shutter charge) and the spring-charge for the mirror system. A shutter control circuit 13 is provided for controlling leading blades and trailing blades of the shutter to provide the determined shutter speed. An aperture control circuit 14 is provided for controlling a diaphragm aperture (not shown) of the camera to provide the determined stop value. A film winding motor 15 is provided for winding a film when each shot has been completed. A shot speed setting device 16 is provided for setting a desired shot speed by means of a dial and a switch (not shown) arranged on an upper cover and the like of the camera. A mode selector 17 is provided for setting either a single mode wherein a single shot is effected for each release operation or a continuous mode wherein a plurality of shots are continuously effected while the release is being pushed.

A control circuit 18 is connected to the above-mentioned circuits 5, 6, 13, 14, motor 11, 15, device 16 and mode selector 17, respectively. When the control circuit 18 receives a release signal SR generated in response to the release operation, an exposure completion signal SE generated by various switches (not shown), a mirror-down completion signal SM and a film feed completion signal SF, it sequentially controls the above elements 4, 5, 6, 11 and 13-15 in predetermined sequence.

In the above-mentioend construction, the photo-electric conversion device 4 and the focus detect circuit 5 constitute a focus detecting means; the motor control circuit 6 and the motor 7 constitute a lens drive controlling means; and the control circuit 18 constitutes a sequence controlling means.

Figure 2:
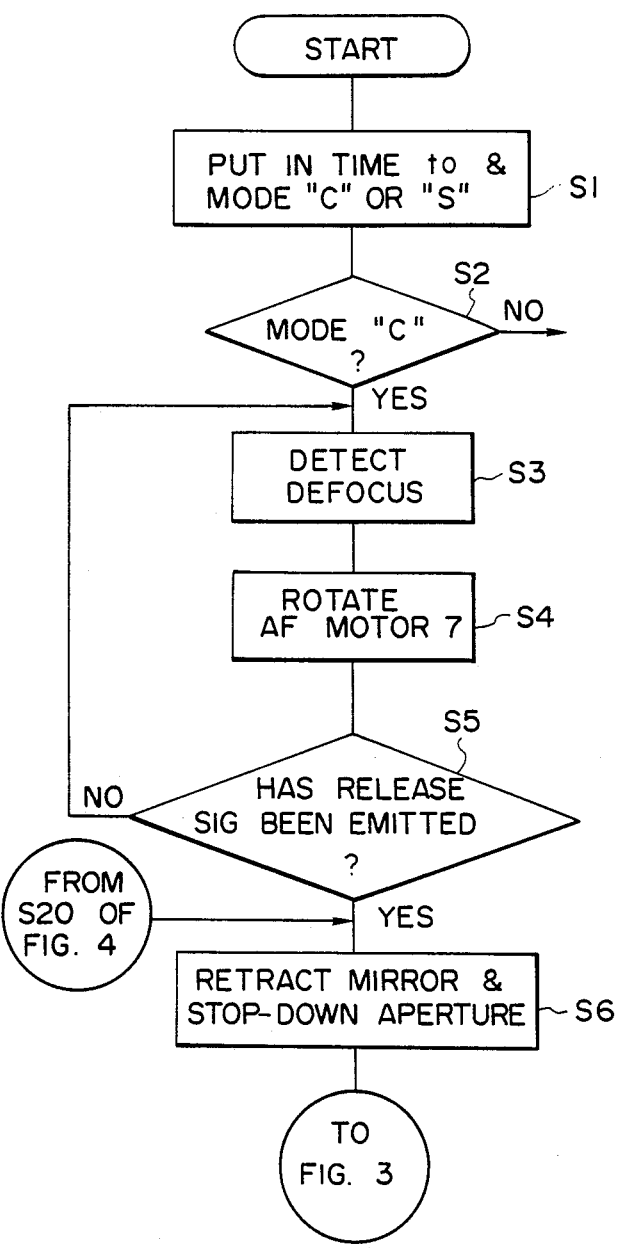
Figure 3:
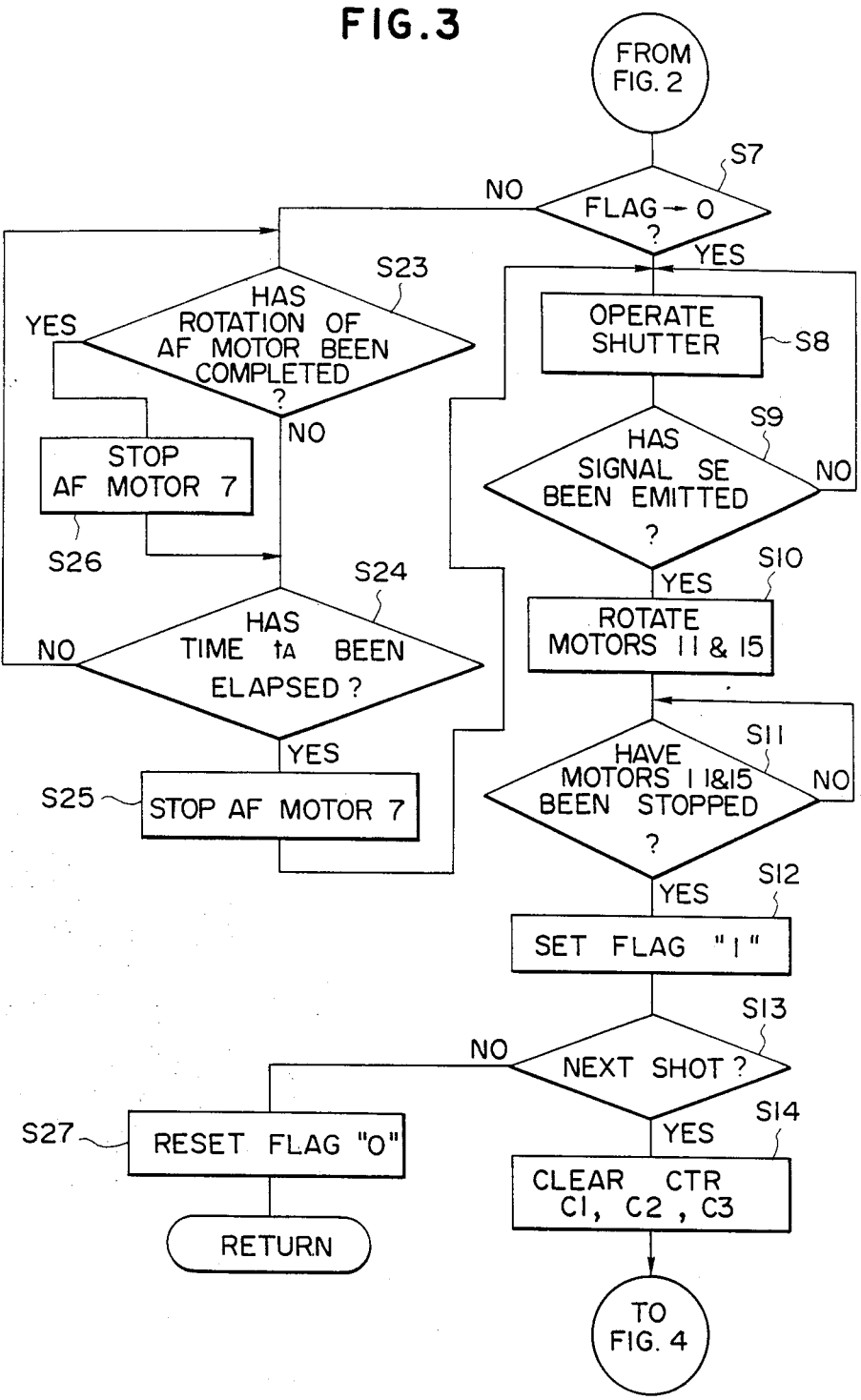
Figure 4:
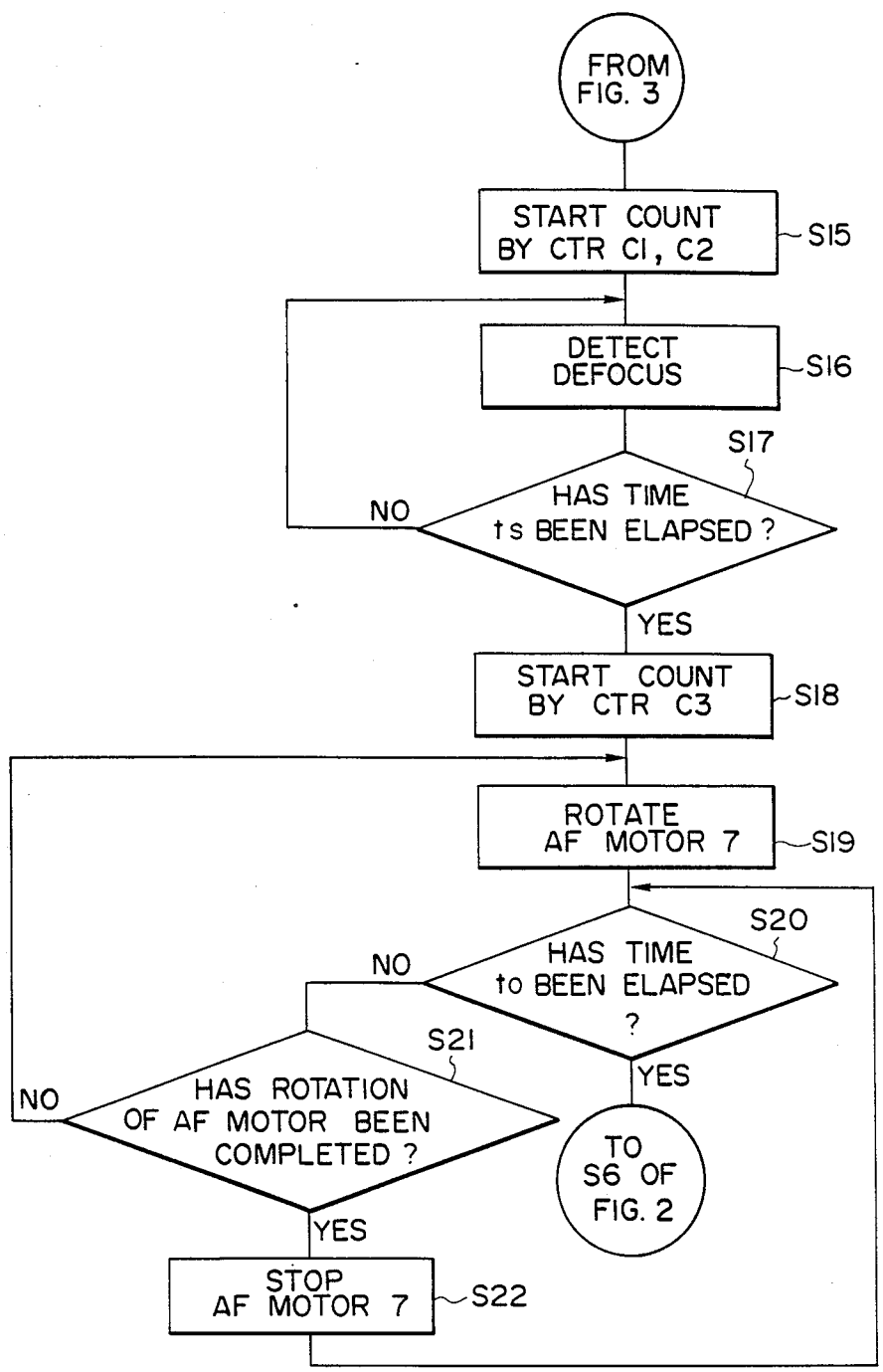

Each of the above-mentioned elements is controlled in accordance with the processes as shown in FIGS. 2 to 4.

When a power switch is energized in response to a first storoke of the pushed release (button), the program shown in FIG. 2 is initiated. In a step S1, time $t_0$ from the completion of the film winding and of the charge (by means of the charge device 12) to the initiation of the mirror-up operation, and an output (from the mode selector 17) representing the continuous mode ("C" mode) or the single mode ("S" mode) are inputted. In a step S2, the photographing mode (C or S) is judged; if "S" mode, an output from the step S2 is sent to a step (not shown); if "C" mode, the output is sent to a step S3.

In the step S3, the defocused amount and the defocused direction are determined by introducing the image signal from the CCD 4 to the focus detect circuit 5. At a step S4, the motor driving signal in dependence upon the output of the step S3 is supplied from the motor control circuit 6 to the motor 7, thereby rotating the latter to shift the camera lens 20 to the best focus or in-focus position.

Then, in a step S5, existence of the release signal (SR) is judged; if affirmative ("existence"), an output of the step S5 is sent to a step S6, where the aperture control circuit 14 is energized by the output of the step S5, thereby lifting the mirror to retract it from the light path (that is to say, effecting the mirror-up operation) and at the same time stopping-down the aperture at a desired or predetermined value. Thereafter, an output of the step S6 is sent to a step S7 (FIG. 3), where a flag is judged. If the flag is "0", an output of the step S7 is sent to a step S8; and, if the flag is "1", the output is sent to a step S23.

In the step S8, the shutter control circuit 13 is energized to drive the leading blades of the shutter and then drive the trailing blades. Then, in a step S9, judgement whether the exposure completion signal (SE) has been emitted or not is performed; if yes, an output of the step S9 is sent to a step S10. In the step S10, the charge motor 11 and the film feed motor 15 are rotated, thereby winding the film by an amount corresponding to one shot, and at the same time energizing the charge device 12 to lower the mirror 1 in the light path (that is to say, effect the mirror-down operation). In a step S11, judgement whether the film feed motor 15 and the charge motor 11 are stopped or not is performed; if yes, an output of the step S11 is sent to a step S12, where the flag "1" is set.

Then, in a step S13, judgement whether the continuous photographing should be continued or not (that is, for example, whether the release signal has further been emitted or not) is performed; if no, an output of the step S13 is sent to a step S27 where the flag is reset, and then is returned to other step; on the other hand, if yes, the output is sent to a step S14.

In the step S14, counters C1, C2 and C3 arranged in the control circuit 18 are cleared to zero, respectively. An output of the step S14 is sent to a step S15 (FIG. 4) where the counters C1 and C2 are activated again. Thereafter, in the step S15, the defocused amount and the defocused direction are determined in the same manner as that in the step S3. Then, in a step S17, judgement whether the counter C2 counts a predetermined time $t_S$ or not (i.e., whether the time $t_S$ has been elapsed or not) is performed; if no, an output of the step S17 is returned to the step S16; on the other hand, if yes, the output is sent to a step S18 where the counter C3 is activated or started.

Then, in a step S19, the motor 7 is rotated. And, in a step S20, judgement whether the counter C1 counts the pre-set time $t_0$ or not is performed; if yes, an output of the step S20 is sent to the step S6 where the mirror 1 is retracted out of the light path and the shutter is stopped-down; on the other hand, if no, the output is sent to a step S21. In the step S21, judgement whether the motor 7 has been rotated by the predetermined amount in accordance with the number of pulses from the photo-interrupter 8 or not is performed; if no, an output of the step S21 is returned to the step S19; if yes, the output is sent to a step S22, where the motor 7 is stopped.

When it is judged that the flag is "1" in the step S7, in the step S23 judgement whether the rotation of the motor 7 in accordance with the number of the pulses from the photo-interrupter 8 has been completed or not is performed again; if yes, an output of the step S23 is sent to a step S26, where the motor 7 is stopped; on the other hand, if no, the output is sent to a step S24, where judgement whether the counter C3 has counted a pre-set time $t_A$ or not is performed. If no, an output of the step S24 is returned to the step 23; however, if yes, the output is sent to a step S25, where the motor 7 is stopped. In this case, the motor 7 is stopped before the camera lens 20 reaches the best or in-focus position.

Figure 5:
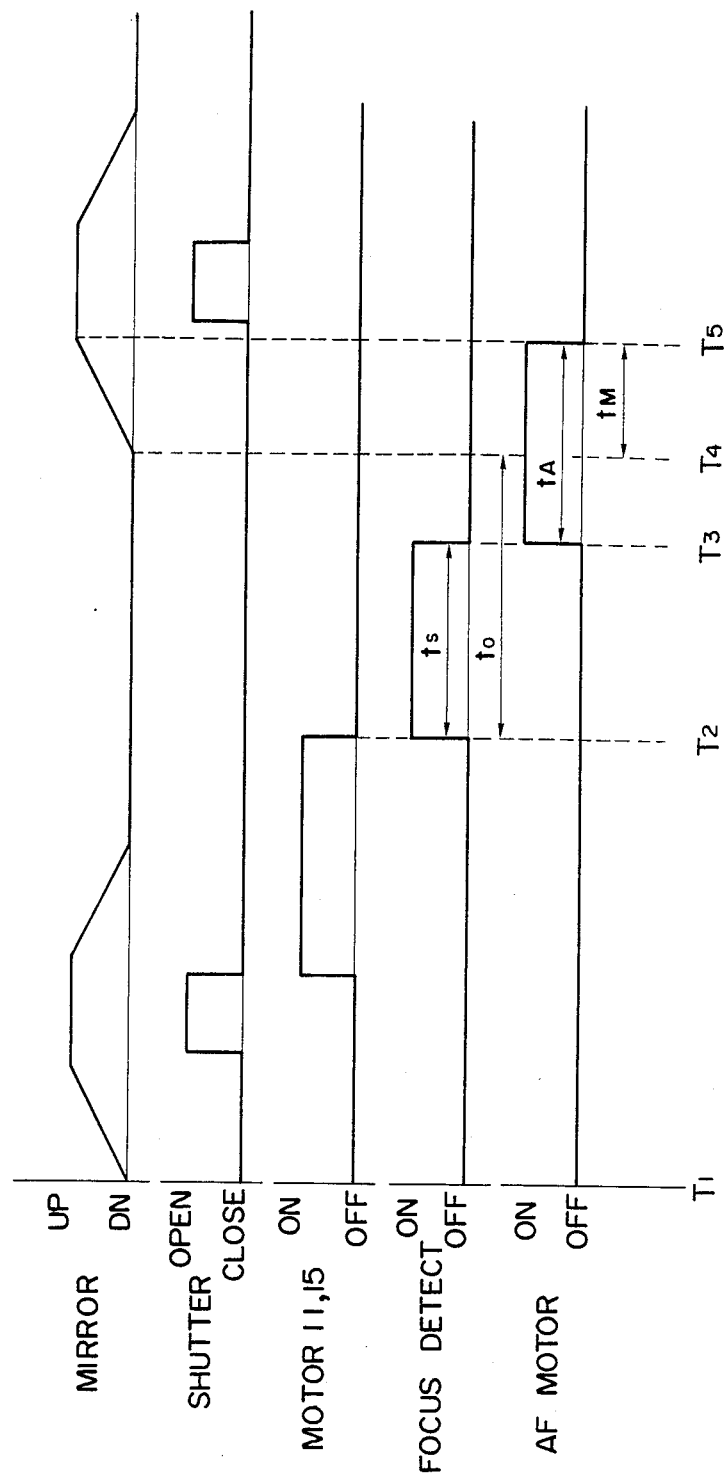

FIG. 5 shows an example of a time chart of the operation of the various elements effected in the sequence as mentioned above.

At a time $T_1$, the mirror-up operation is initiated to retract the mirror 1 out of the light path. Upon completion of the mirror-up operation, the shutter control operation is initiated. Upon completion of the shutter control operation (that is, completion of the exposure operation), the film feed motor 15 and the charge motor 11 are energized, thereby effecting the mirror-down operation. As soon as the film feed motor 15 and the charge motor 11 are stopped (time $T_2$) the focus detecting operation is initiated for a predetermined time interval $t_S$ required for detecting the best focus position. When the defocused amount and the defocused direction can be determined for a relatively short time interval, such as in the case where the brightness of the object is relatively high and/or the contrast is clear, the focus detecting operations are repeated within said predetermined time interval $t_S$. On the other hand, when the focus detecting operation is not completed within said predetermined time interval $t_S$, the signal regarding the determined results is not outputted. When the predetermined time interval $t_S$ has been elapsed (time $T_3$), the rotation of the motor 7 is initiated; the rotation of the motor 7 is continued for a predetermined time interval $t_A$ required for driving the motor 7. Also, when, from the time $T_2$, a time interval $t_0$ defined by the following equation (1) has been elapsed ($T_4$), the mirror-up operation (for lifting the mirror 1 is initiated:

$$t_0 = t_S + t_A - t_M \qquad (1)$$

(here, $t_M$ is a time interval required for effecting the mirror-up) When the mirror-up operation is completed ($T_5$), the motor 7 is stopped. The time $T_4$ for initiating the mirror-up operation may be determined, on the basis of the time $T_3$ (used as a reference point), by a value ($t_A - t_M$).

Incidentally, since the above-mentioned time intervals $t_S$ and $t_A$ can be set in the shot speed setting device 16, it is possible to perform the continuous photographing utilizing various shot speeds.

In the above-mentioned example shown in FIG. 5, although the time interval $t_S$ for performing the focus detecting operation and the time interval $t_A$ for driving the motor 7 are set in order, a new time interval equal to the sum of the above time intervals ($t_S + t_A$) may be set on the basis of a reference point $T_2$ (which is the time when the charging operation is completed), whereby the focus detecting operations and the motor driving operations are repeatedly performed alternately.

What is claimed is:

1. A camera system, comprising:
   a phototaking lens forming a phototaking optical path;
   a moving mirror arranged in said phototaking optical path;
   mirror operating means actuatable to retract said moving mirror from said phototaking optical path for the purpose of exposing a film;
   focal point detecting means for determining an amount of movement of said phototaking lens with respect to an object to be photographed on the basis of light from the object via said moving mirror in the phototaking optical path;
   lens moving means for moving said phototaking lens according to the determined amount of movement of said lens; and
   control means for controlling said mirror operating means and said lens moving means, the control means controlling timing of the start of the actuation of said mirror operating means so that substantially on the completion of the retraction of said moving mirror from said phototaking optical path, said lens moving means completes movement of said phototaking lens.

2. A camera system according to claim 2, wherein said control means causes the actuation of said mirror operating means to be started at a point in time that is delayed relative to the start of movement of said phototaking lens by said lens moving means and that is determined by subtracting a mirror retracting period from a lens movement period.

3. A camera system according to claim 2, wherein said control means generates a start signal for starting the detecting by said focal point detecting means and causes the actuation of said mirror operating means to be started at a point in time that is delayed relative to said start signal and that is determined by subtracting a mirror retracting period from the sum of a focal point detecting period and a lens movement period.

4. A camera system according to claim 2, wherein said control means includes means for setting said detecting period and said lens movement period.

5. A camera system, comprising:
   a phototaking lens forming a phototaking optical path;
   a moving mirror arranged in said phototaking optical path;
   mirror operating means actuatable to retract said moving mirror from said phototaking optical path for the purpose of exposing a film;
   focal point detecting means for determining an amount of movement of said phototaking lens with respect to an object to be photographed on the basis of light from the object via said moving mirror in the phototaking optical path;
   lens moving means for moving said phototaking lens according to the determined amount of movement of said lens;
   continuous photographing operating means actuatable for repeatedly performing photographing operations including winding a film and exposing a film; and
   control means for controlling said mirror operating means and said lens moving means in response to each of photographing operations by said continuous photographing operating means, said control means controlling timing of the start of the actuation of said mirror operating means so that substantially on the completion of the reaction of said moving mirror from said phototaking optical path, said lens moving means completes the movement of said phototaking lens.

* * * * *